US006652013B1

(12) United States Patent
Peterson

(10) Patent No.: US 6,652,013 B1
(45) Date of Patent: Nov. 25, 2003

(54) DECORATIVE ORNAMENT/LIGHT REMOVING AND HANGING TOOL

(76) Inventor: Dale L. Peterson, 23449 E. 750$^{th}$ St., Colona, IL (US) 61241

( * ) Notice: Subject to any disclaimer, the term of this patent is extended or adjusted under 35 U.S.C. 154(b) by 0 days.

(21) Appl. No.: 10/196,470

(22) Filed: Jul. 16, 2002

(51) Int. Cl.[7] .................................................. B25J 1/00

(52) U.S. Cl. ........................................ 294/19.1; 294/26

(58) Field of Search ............................... 294/19.1, 19.3, 294/22–24, 26; 16/429; 15/144.3, 144.4

(56) References Cited

U.S. PATENT DOCUMENTS

| | | | | | |
|---|---|---|---|---|---|
| 2,319,992 | A | * | 5/1943 | Hubbard | 294/19.1 |
| 4,447,927 | A | * | 5/1984 | Malless, Jr. | 15/236.04 |
| 4,524,484 | A | * | 6/1985 | Graham | 16/429 |
| 4,659,125 | A | * | 4/1987 | Chuan | 294/19.2 |
| 4,793,646 | A | * | 12/1988 | Michaud, Jr. | 294/19.1 |
| 4,881,338 | A | * | 11/1989 | Lung | 43/5 |
| 5,553,905 | A | * | 9/1996 | Bentivegna | 294/24 |
| 6,227,584 | B1 | * | 5/2001 | Reuther | 294/19.1 |
| 6,450,557 | B1 | * | 9/2002 | Martinez | 294/19.1 |

* cited by examiner

*Primary Examiner*—Dean J. Kramer

(57) ABSTRACT

A decorative ornament/light removing and hanging tool for removing and hanging strings of lights on building structures. The decorative ornament/light removing and hanging tool includes a base assembly including an elongate tubular base member having an open second end and a bore extending therein through the open second end, and also including a handle being attached at a first end of the elongate tubular base member; and also includes an extension assembly including a first tubular extension member being adjustably extended in and from the elongate tubular base member, and also including a second tubular extension member being adjustably coupled to the first tubular extension member, and further including a coupler member coupling the first and second tubular extension members together; and further includes a fastener assembly for fastening the first tubular extension member to the elongate tubular base member; and also includes a hook assembly being attached to the extension assembly for removing strings of hanging lights and ornaments from building structures.

1 Claim, 3 Drawing Sheets

DECORATIVE ORNAMENT/LIGHT REMOVING AND HANGING TOOL

BACKGROUND OF THE INVENTION

1. Field of the Invention

The present invention relates to string light removers and more particularly pertains to a new decorative ornament/light removing and hanging tool for removing and hanging strings of lights on building structures.

2. Description of the Prior Art

The use of string light removers is known in the prior art. More specifically, string light removers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes inventions having tubular sections adjustably extendable and also having hooks on the ends thereof for removing and hanging objects from structures. While these devices fulfill their respective, particular objectives and requirements, the aforementioned patents do not disclose a new decorative ornament/light removing and hanging tool.

SUMMARY OF THE INVENTION

The general purpose of the present invention, which will be described subsequently in greater detail, is to provide a new decorative ornament/light removing and hanging tool which has many of the advantages of the string light removers mentioned heretofore and many novel features that result in a new decorative ornament/light removing and hanging tool which is not anticipated, rendered obvious, suggested, or even implied by any of the prior art string light removers, either alone or in any combination thereof. The present invention includes a base assembly including an elongate tubular base member having an open second end and a bore extending therein through the open second end, and also including a handle being attached at a first end of the elongate tubular base member; and also includes an extension assembly including a first tubular extension member being adjustably extended in and from the elongate tubular base member, and also including a second tubular extension member being adjustably coupled to the first tubular extension member, and further including a coupler member coupling the first and second tubular extension members together; and further includes a fastener assembly for fastening the first tubular extension member to the elongate tubular base member; and also includes a hook assembly being attached to the extension assembly for removing strings of hanging lights and ornaments from building structures. None of the prior art includes the combination of elements of the present invention which are angled to allow for easier removing and hanging of strings of lights and ornaments.

There has thus been outlined, rather broadly, the more important features of the decorative ornament/light removing and hanging tool in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new decorative ornament/light removing and hanging tool which has many of the advantages of the string light removers mentioned heretofore and many novel features that result in a new decorative ornament/light removing and hanging tool which is not anticipated, rendered obvious, suggested, or even implied by any of the prior art string light removers, either alone or in any combination thereof.

Still another object of the present invention is to provide a new decorative ornament/light removing and hanging tool for removing and hanging strings of lights on building structures.

Still yet another object of the present invention is to provide a new decorative ornament/light removing and hanging tool that is easy and convenient to assemble and use.

Even still another object of the present invention is to provide a new decorative ornament/light removing and hanging tool that would save the user substantial time to hang and remove the string of lights and would also prevent the risk of the user falling off ladders otherwise used to hang and remove the string of lights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
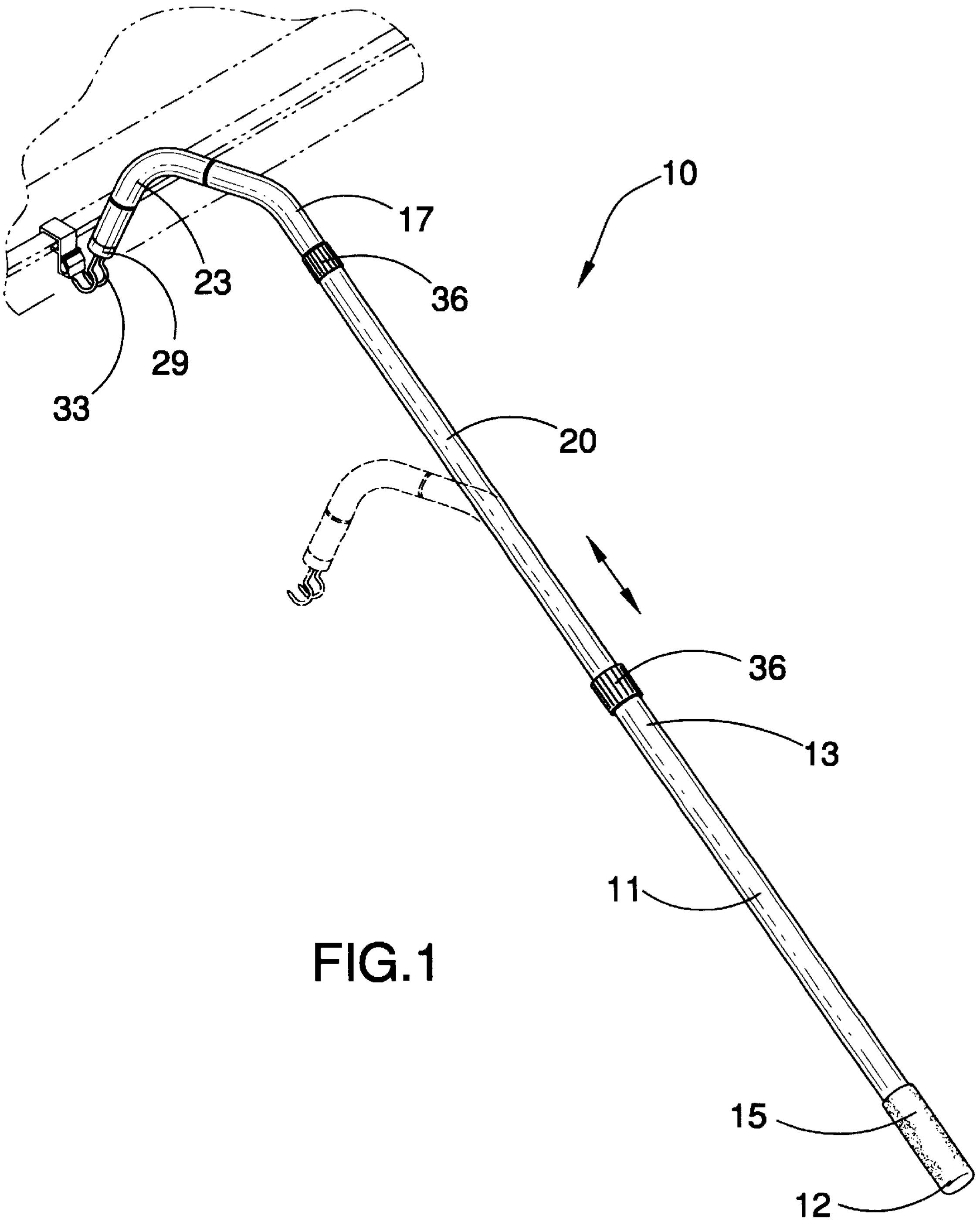
FIG. 1 is a perspective view of a new decorative ornament/light removing and hanging tool according to the present invention.
Figure 2:
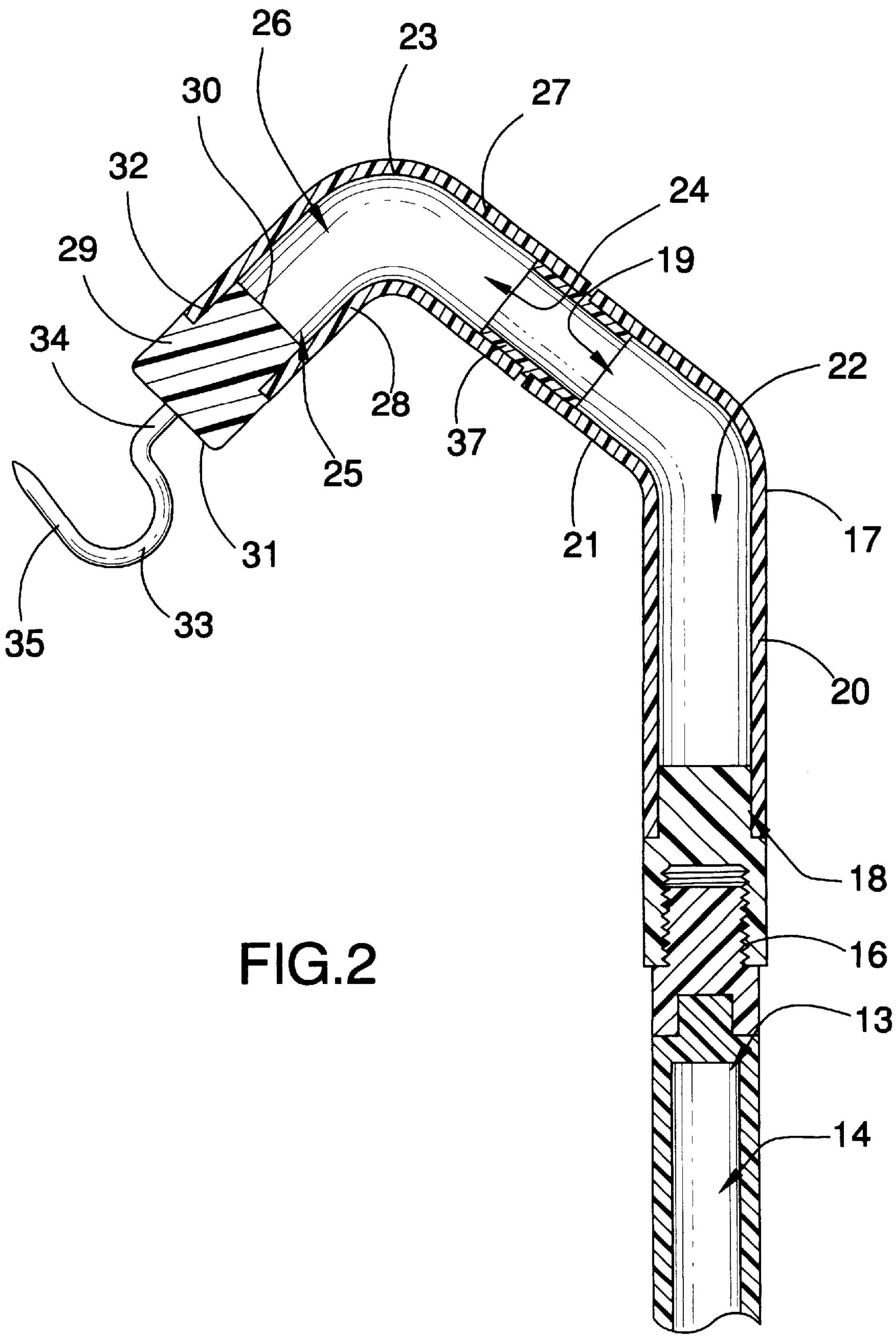
FIG. 2 is a detailed cross-sectional view of tubular extension member of the present invention.
Figure 3:
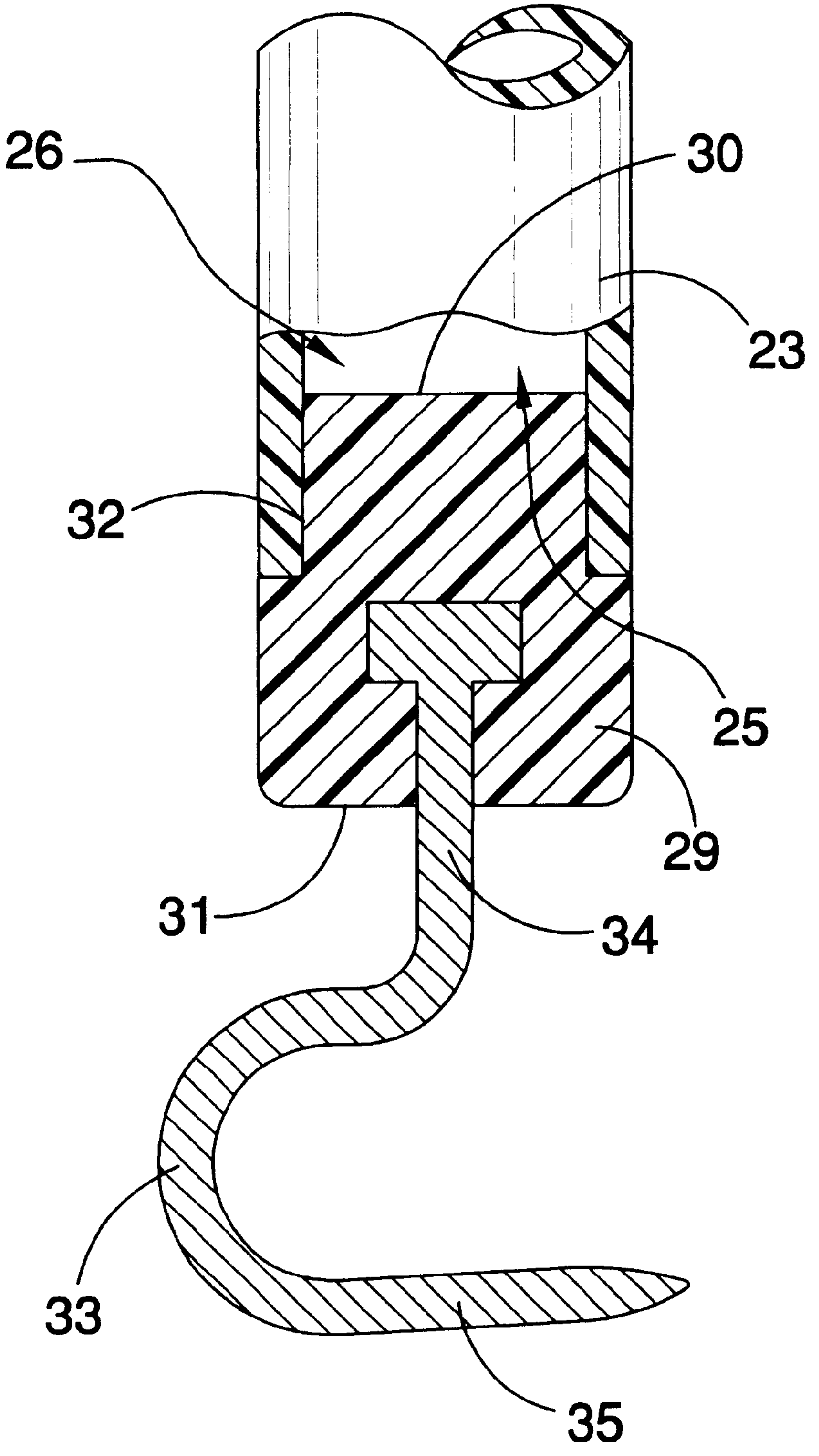
FIG. 3 is a detailed cross-sectional view of the hook assembly of the present invention.

With reference now to the drawings, and in particular to FIGS. 1 through 3 thereof, a new decorative ornament/light removing and hanging tool embodying the principles and concepts of the present invention and generally designated by the reference numeral 10 will be described.

As best illustrated in FIGS. 1 through 3, the decorative ornament/light removing and hanging tool 10 generally comprises a base assembly including an elongate tubular base member 11 having [an open] a second end 13 and a bore 14 extending therein [through the open second end 13], and also including a handle 15 being conventionally attached at a first end 12 of the elongate tubular base member 11. The elongate tubular base member 11 has an annular recessed portion 16 at the second end 13 thereof with the annular recessed portion 16 being threaded about an exterior side thereof.

An extension assembly includes a first tubular extension member 17 being adjustably extended in and from the elongate tubular base member 11, and also includes a second tubular extension member 23 being adjustably coupled to the first tubular extension member 17, and further includes a coupler member 37 coupling the first and second tubular extension members together 17, 23. The first tubular extension member 17 has open first and second ends 18,19 and a bore 22 extending therethrough, and also has a first portion 20 and a second portion 21 being angled relative to the first portion 20. The second tubular extension member 23 has open first and second ends 24, 25 and a bore 26 extending therethrough, and also has a first portion 27 and a second portion 28 being angled relative to the first portion 27. The coupler member 37 is movably disposed in the bore 22 and through the open second end 19 of the first tubular extension member 17 and in the bore 26 and through the open first end 24 of the second tubular extension member 23.

A fastener 36 for fastening the first tubular extension member 17 to the elongate tubular base member 11 includes a collar having a threaded inner side wall and being removably threaded about the annular recessed portion 16 of the elongate tubular base member 11. A hook assembly is conventionally attached to the extension assembly for removing and hanging strings of hanging lights and ornaments. The hook assembly includes a plug member 29 being engaged in the open second end 25 of the second tubular extension member 23, and also includes a hook member 33 being extended in and from the plug member 29. The plug member 29 has a first end 30 and a second end 31 and also has an annular recessed first end portion 32 being engaged in the bore 26 and through the second end 25 of the second tubular extension member 23. The hook member 33 includes a stem portion 34 being conventionally disposed in the second end 31 of the plug member 29 and also includes a generally C-shaped portion 35 having a pointed tip for hooking and lifting the strings of lights and ornaments displayed upon building structures.

In use, the user adjusts the length of the decorative ornament/light removing and hanging tool 10 using the collar 36 and reaches to where the strings of lights and ornaments are hanging upon the building structure and slips the C-shaped portion 35 of the hook member 33 under the string and lifts the string off the support members which are attached to the building structure for removing the strings of lights and ornaments. To hang the strings of lights and ornaments, the user places the string upon the C-shaped portion 33 and slips the string over the support members.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the decorative ornament/light removing and hanging tool. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative ornament/light removing and hanging tool comprising:

a base assembly including an elongate tubular base member having a second end and a bore disposed therein, and also including a handle being attached at a first end of said elongate tubular base member, said elongate tubular base member having an annular recessed portion at said second end thereof, said annular recessed portion being threaded about an exterior side thereof;

an extension assembly including a first tubular extension member being adjustably extended from said elongate tubular base member, and also including a second tubular extension member being adjustably coupled to said first tubular extension member, and further including a coupler member coupling said first and second tubular extension members together, said first tubular extension member having open first and second ends and a bore extending therethrough, and also having a first portion and a second portion being angled relative to said first portion, said second tubular extension member having open first and second ends and a bore extending therethrough, and also having a first portion and a second portion being angled relative to said first portion, said coupler member being movably disposed in said bore of said first tubular extension member and through said open second end of said first tubular extension member and in said bore of said second tubular extension member and through said open first end of said second tubular extension member;

a fastener assembly for fastening said first tubular extension member to said elongate tubular base member; and a hook assembly being attached to said extension assembly for removing strings of hanging lights and ornaments.

* * * * *